April 7, 1970          R. C. MURRAY          3,505,158

COMPOSITE POROUS-DENSE CERAMIC ARTICLE

Filed Dec. 22, 1967

INVENTOR.
Ronald C. Murray
BY
Barnard, McGlynn & Lissing
ATTORNEYS 3,505,158
COMPOSITE POROUS-DENSE CERAMIC ARTICLE
Ronald C. Murray, Golden, Colo., assignor to Coors Porcelain Company, Golden, Colo., a corporation of Colorado
Filed Dec. 22, 1967, Ser. No. 692,919
Int. Cl. C04b *39/00;* B32b *17/06;* C03b *23/20*
U.S. Cl. 161—110                                    7 Claims

ABSTRACT OF THE DISCLOSURE

The ceramic article of this invention is a monolithic ceramic body having a dense sintered ceramic portion surrounded by a porous ceramic portion. Either or both portions can have bores or inserts extending therethrough if desired. Such articles are useful particularly in those applications where there is to be cycling between high and low temperatures or where the outside of the article is to be exposed to a temperature considerably different than that at the inner portion of the article.

---

Figure 1:
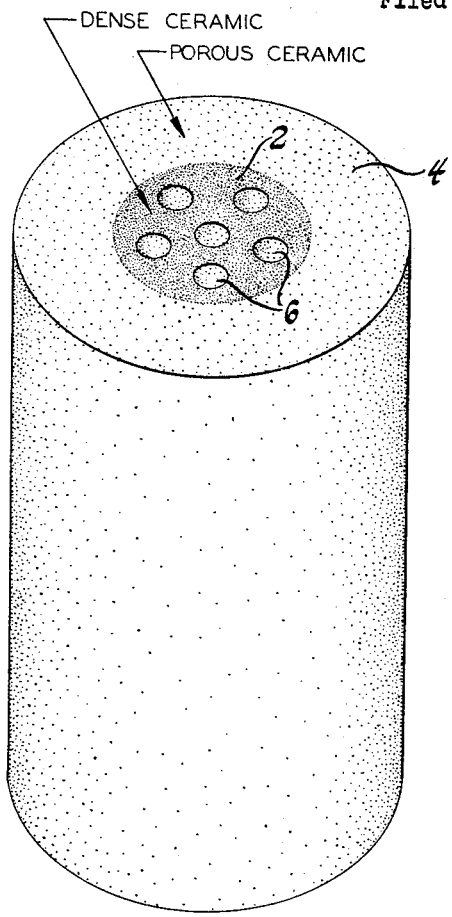

The subject matter of the present invention is a composite ceramic article having a dense ceramic portion surrounded and integral with a porous ceramic portion. Such structure finds particular utility in applications where the ceramic article is to be subjected to a substantial thermal gradient from the interior to the exterior thereof. Porous ceramic while deficient in many physical characteristics as compared with dense ceramic, is nevertheless marked by a high degree of thermal shock resistance. Hence, it can withstand a considerably greater thermal gradient than can dense ceramic. When an article made in accordance with the present invention is, for example, subjected to a high temperature at the dense center portion thereof and to a low temperature at the surface of the porous ceramic portion, the actual temperature differential through the section of the dense portion can be well within the limit of the ability of the dense portion to withstand cracking due to thermal shock, the greater portion of the temperature differential throughout the total cross section of the article occurring across the surrounding porous ceramic portion which is capable of withstanding greater temperature differentials and greater thermal shock. The dense portion, on the other hand, supplies the needed mechanical strength, fluid impermeability and other desirable physical characteristics required for the article.

Figure 2:
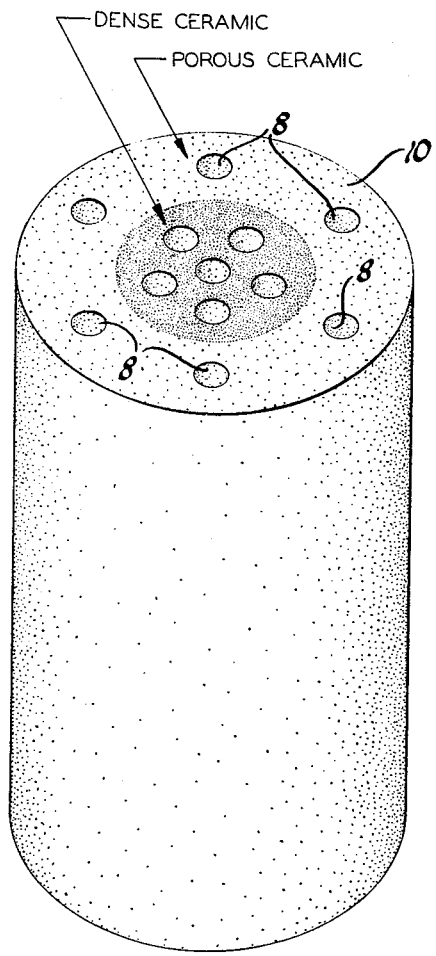

The invention will be described in detail with reference to specific embodiments thereof as shown in the drawings in which:

FIGURE 1 is a cross-sectional view of an elongated cylindrical article made in accordance with the invention; and FIGURE 2 is a view like that shown in FIG. 1 but of another embodiment of the invention.

Referring now to FIGURE 1, the article shown comprises a unitary or monolithic ceramic structure having an inner dense core portion 2 surrounded by an outer porous ceramic portion 4. The inner portion 2 has a plurality of bores 6 extending therethrough. The overall shape of the article is that of a right cylinder which can be of any desired length. Such an article is useful, for example, as a heat exchanger to cool hot fluid circulated through the bores 6 in the dense core portion, the article being in an environment of cooling air or other fluid to remove heat from the circulated hot liquid. Because of the extremely high shock resistance of the porous ceramic portion, the article can be subjected to extremely high temperature gradients, across the distance from the bores to the exterior surface of the article, as compared with an article, as compared with an article entirely of dense ceramic.

The preferred ceramic for manufacture of the bodies of this invention is sintered aluminum oxide base ceramic. Such ceramic contains upwards of about 85% by weight aluminum oxide and the remainder small amounts of mineralizers or glass forming oxides which can be added as silica, the silicates such as clay and talc, the alkali and alkaline earth oxides, carbonates, phosphates and like such as the oxides, phosphates or carbonates of sodium, calcium, strontium and magnesium; and various other of the metal oxides such as chromium oxide, manganese oxide and the rare earth oxides well known in the art for their glass modifying or grain growth inhibiting effect when used in small amounts in high alumina ceramics. Aluminum oxide base ceramic is extremely hard, abrasion resistant, heat shock resistant and tough as compared with other ceramics. Examples of specific sintered aluminum oxide base ceramics are as follows, the percentages in each case being by weight: 100% aluminum oxide; 99.5% aluminum oxide, .5% chromium oxide; 94% aluminum oxide; 3% silica, 3% calcium oxide; 90% aluminum oxide; 5% silica, 3% magnesium oxide; 2% calcium oxide; 85% aluminum oxide; 10% silica; 3% calcium oxide and 2% magnesium oxide. In all of these examples where silica is present in the raw batch, either as such or in a combined form, the final ceramic structure after the sintering operation consists of a body of aluminum oxide crystals with an intercrystalline glassy phase. Where silica or other glass forming ingredient is not included, the aluminum oxide crystals are bonded to each other in the sintering operation. Firing temperatures of from about 1400° to 1900° C. are used to sinter aluminum oxide base ceramics, the precise firing temperature and schedule depending of course upon the exact formulation being used as is well known in the art.

While aluminum oxide is preferred for most applications other ceramic compositions may be used in the practice of the invention and in certain instances will be desirable. For example, sintered beryllium oxide base ceramic is excellent where extremely high thermal conductivity is essential. The composition of such ceramic is similar to that described above with reference to aluminum oxide base ceramics except that the alumina is replaced by beryllia.

The article shown in FIGURE 1 can be manufactured by first forming a ceramic powder compact to the shape of the inner dense portion 2 and then compacting around this a formulation of ceramic powder and organic material which, upon firing, provides a porous ceramic. For example, as the first step in manufacture, ceramic powder can be isostatically molded to form a cylindrical compact after which the bores can be machined through the cylinder from one end to the other thereof. In the isostatic molding process the ceramic material is first prepared in a loose compactible finely divided form preferably containing a small amount of paraffin wax or similar organic binder and prepared by the conventional spray drying process. This loose ceramic material is then placed in a rubber or other elastomeric collapsible mold after which fluid pressure is applied to the outside of the elastomeric mold such that the mold partially collapses and thereby compacts or compresses the ceramic material into a self-sustaining green compact. Upon relieving the fluid pressure from the elastomeric mold, the mold withdraws by way of its own resiliency from the green compact and the compact is thus easily removed from the mold. One of the big advantages to this process is the excellent uniformity attained in compaction of the ceramic which assures minimum possibilities of warpage or other distortion during firing. The green compact is relatively soft and machinable and hence one or more bores can be drilled through the compact if desired in the final article. Preferably, however, such compact with bores extending therethrough can be prepared by the process disclosed and covered by my co-pending United States patent application 660,550, filed July 19, 1967. In this process such green compact is made by supporting one or more arbors within a generally tubular shaped resilient collapsible mold, filling the mold with the loose compactible material after which the arbor or arbors are supported within the mold only by the compactible material such that the arbor or arbors are free to shift within the mold during compaction of the material. Then fluid pressure is applied to the mold to compact the material. After compaction the arbor or arbors can be removed to provide a bored article or they can be left in place to provide an article with one or more inserts therein. But however the green compact which is to form the core portion is formed, this green compact is, as the next step in the process, mounted concentrically in a collapsible cylindrical rubber mold and the space between the compact and the mold is filled with a mixture of ceramic powder and particulate organic material which, upon firing proves a porous ceramic structure. This mixture is then isostatically pressed radially inwardly against the core compact, by fluid pressure, to form a unitary self-sustaining composite compact.

The ceramic formulation of the core portion contains only a small amount, less than 5%, of organic binder, such as wax, merely to provide good green strength and upon firing to sintering temperature the resultant fired ceramic core will be extremely dense. Using aluminum oxide ceramic, for example, fired densities in excess of 3.6 grams/cc. are easily attained, the theoretical density of aluminum oxide being about 4 grams/cc.

On the other hand, the formulation used for the surrounding ceramic portion must be such as to result in a porous structure upon firing. This can be easily accomplished by including in the powder material compacted around the core portion an amount of granular organic material which burns out during firing to provide the porous structure. For example, particulate ceramic material prepared by the spray drying process can be mixed with sawdust, extremely small organic resin beads or even coffee grounds or the like in a ratio of about 70% to 90% ceramic and the remainder organic material. Such mixture is then isostatically molded around the core element and upon firing to sintering temperature results in the desired porous ceramic structure surrounding the dense core. The organic material burns out and vaporizes during the firing.

Alternatively, the porous structure can be attained by using a ceramic formulation which includes an inorganic ingredient which breaks down to evolve gas during firing. An example is dolomite, $CaMg(CO_3)_2$ which can be included in amounts of about 5 to 10% to provide the desired porous structure. As still another alternative, a ceramic formulation which includes a substantial portion of relatively large ceramic granules can be used. It will be understood that numerous formulations and the techniques for attaining porous ceramic as well as numerous formulations and the techniques for attaining dense ceramics are per se broadly old and well known in the art.

After the porous ceramic formulation is pressed around the core portion, the resulting unitary composite green compact is then fired to the sintering temperature of the ceramic thereby resulting in a unitary or monolithic article having the bored dense ceramic core portion surrounded by a porous ceramic portion as shown in FIGURE 1.

The precise densities for the dense portion and the porous portion will, of course, depend on the particular use to be made of the article. In general, however, the dense ceramic portion should preferably have a density of at least about 90% of theoretical (i.e., 90% of the theoretical highest density possible for the particular ceramic being used) and the porous portion should preferably have a density of less than 85% of theoretical, ideally from 50% to 80% of theoretical where the chief characteristic sought in the porous portion is optimum thermal shock resistance commensurate with good physical strength. When alumina base ceramic is used for both portions, as is generally preferred, a typical example would be a dense portion with a density of 3.7 g./cc. and a porous portion with a density of 2.5 g./cc.

The embodiment shown in FIGURE 2 differs from that shown in FIGURE 1 in that there are bores 8 through the porous ceramic portion 10 which surrounds the dense ceramic portion 12. This embodiment can be manufactured as described above for FIGURE 1 except for the step required to provide the bores in the outer porous portion. This can be accomplished by machining the bores in the porous portion prior to firing or, alternatively and preferably, by using the method described and claimed in my aforesaid co-pending United States patent application.

It will be understood that while the invention has been described with reference to certain specific embodiments, various changes may be made, all within the full and intended scope of the claims which follow. For example, instead of a single multi-bore core, it may be desirable to use a plurality of tubes of dense ceramic as core elements. Dense ceramic tubes can also be used to provide fluid impermeable passages through the porous portion of the FIGURE 2 embodiment. This is easily accomplished by using ceramic tubes of dense formulation as the arbors in the method of my aforesaid co-pending patent application, such tubular arbors being left in the green compact during firing and becoming a monolithic part of the fired ceramic article. Where the tubes are in a "green" or unfired state such as to lack physical strength at the time they are used as the arbors, hard metal rods can be inserted into the bores prior to pressing the porous ceramic formulation around the tubes to thereby prevent collapse of the tubes from the pressure applied. Such rod can then be removed after such pressing operation and prior to firing. As a further example, for some applications it may be desirable to surround the porous portion with a thin dense fluid impermeable outer shell. This can be done by compacting a thin layer of dense ceramic formulation around the porous portion prior to firing, the resulting fired monolithic article having a dense ceramic core and outer shell with porous ceramic portion therebetween. As a still further example, the dense ceramic core portion, say a tube having a density of 95% of theoretical, can be surrounded by concentric progressively less dense ceramic portions ranging from a density of, for example, 90% of theoretical for the surrounding portion immediately adjacent to tubular core and down to a density of, for example, 50% of theoretical for the outermost surrounding portion.

I claim:
1. A monolithic ceramic article having a dense ceramic core portion surrounded by a porous ceramic portion.
2. A monolithic ceramic article as set forth in claim 1 wherein the dense core portion has at least one passage extending therethrough.
3. A monolithic ceramic article as set forth in claim 1 wherein the porous ceramic portion has at least one passage extending therethrough.
4. A monolithic ceramic article as set forth in claim 1 wherein both of said portions are of substantially the same ceramic.

5. A monolithic ceramic article as set forth in claim 4 wherein both of said portions are of aluminum oxide base ceramic.

6. A monolithic ceramic article as set forth in claim 1 wherein the core portion has a density of at least about 90% of theoretical and the surrounding portion has a density of less than about 85% of theoretical.

7. A monolithic ceramic article as set forth in claim 6 wherein the surrounding portion has a density of from about 50% to 80% of theoretical.

References Cited

FOREIGN PATENTS 1,040,846 9/1966 Great Britain.

WILLIAM J. VAN BALEN, Primary Examiner

U.S. Cl. X.R.

65—18, 48; 161—112, 113, 160, 166; 264—60